Figure 1:
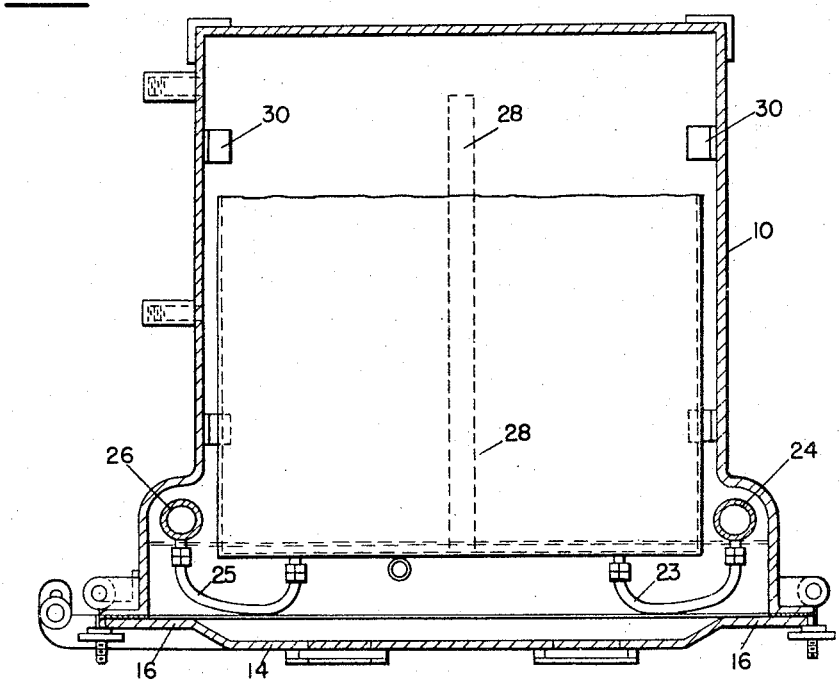

May 31, 1949.

E. W. FLOSDORF 2,471,677

PROCESS OF DESICCATING ORANGE JUICE
INVOLVING FREEZE-DRYING
Filed July 20, 1946

INVENTOR
EARL W. FLOSDORF
BY
ATTORNEYS

Patented May 31, 1949

2,471,677

UNITED STATES PATENT OFFICE 2,471,677

PROCESS OF DESICCATING ORANGE JUICE INVOLVING FREEZE DRYING

Earl W. Flosdorf, Forest Grove, Pa., assignor to Lyophile-Cryochem Corporation, Baltimore, Md., a corporation of Maryland Application July 20, 1946, Serial No. 685,019

1 Claim. (Cl. 99—206)

This invention relates to improvements in the production of desiccated orange juice which is stable for relatively long periods of time if stored in sealed containers at appropriately low moisture contents, and which on the addition of water, reconstitutes to a product which is the substantially fully equivalent of fresh orange juice.

The production of a desiccated orange juice is described in my application Serial No. 640,364, filed January 10, 1946. In accordance with the process described in that application the orange juice after concentration from the liquid state, as by the use of a relatively low temperature vacuum evaporating or fractional freezing, is subjected to desiccation by the freeze-drying process, that is, by freezing the material and removing the water vapor therefrom with the use of a high vacuum while maintaining the temperature of the material below 0° C., and usually, during the time when the major portion of the water is being removed, below −10° C., for example, −20 to −30° C. The preconcentration of the material as by vacuum evaporation or fractional freezing is carried out to remove something over one-half the water present in the fresh juice, for example, to produce a product having from one-seventh to one-half the volume of the initial material. The final product has a water content which should not exceed 1% and advantageously is considerably lower than this, for example, as low as 0.15% after sealing in containers. To assist in packaging the material, which is highly hygroscopic, at the low moisture content level required it is desirable to increase the temperature of the material at the end of the desiccation operation to a temperature in excess of room temperature, for example, as high as 60 to 65° C. and to transfer it to the containers in which it is to be sealed while maintaining it at such temperature to minimize the absorption of water from the atmosphere during the transferring operation, as described in Patent 2,396,561, issued March 12, 1946. The addition of a small quantity of sugar as described in Patent 2,380,036 and/or a small quantity of a protective colloid such as gelatin or the like improves the product.

I have now found that the properties of the freeze dried product obtained from a preconcentrated orange juice can be very much improved, and a dried product of high quality obtained, if, after the concentration and prior to the freeze drying a minor portion, for example, 25%, of fresh juice is added to the concentrated product and the resulting mixture is then subjected to the freeze drying operation. Such inclusion of a minor portion of fresh juice in the preconcentrated material which is dried simplifies the drying operation, in that difficulties sometimes encountered due to what may be termed the plastic nature of the frozen material, reflected during the operation in puffing or foaming, are decreased. Equivalent results either from the standpoint of quality of the final product or decrease in the difficulties of processing are not obtained by reducing the degree of preconcentration; that is a preconcentrated product of a given water content is not the equivalent either from the standpoint of product quality or of processing properties of a product of the same water content obtained by mixing a more highly concentrated material with fresh juice. I have no explanation for this observed phenomenon.

In accordance with the present invention, orange juice is preconcentrated from the liquid state by appropriate means, as by vacuum evaporation at relatively low temperatures for example, 10° C., or by subjecting it to partial freezing with the formation of a mixture of ice and concentrate and separating the concentrate from the ice as by centrifuging. Such preconcentration should be carried out to an extent such that the concentrate has a volume from about one-seventh to one-half the original volume, corresponding to the removal of something over one-half the water originally present. Care should be taken that the preconcentration is carried out in such a way as to affect the flavor of the juice no more than is necessary. The methods of concentrating the juice from the liquid state are well known.

To the preconcentrated product so obtained is added a minor portion of fresh juice, corresponding to less than one-half of the fresh juice represented by the concentrate and usually about 25% of that quantity. About 10 to about 50% may be used. The resulting mixture is then frozen, and, after freezing, is subjected to a high vacuum whereby the water present is converted to vapor and the product is dried. The vacuum used is a high vacuum, usually from 50 to 2500 microns, although, particularly at the end of the operation, it may be higher, that is, the pressure may be less, down to 10 microns or even less. During the initial stages of this operation and until nearly all of the water present has been removed, the temperature of the product is kept below 0° C., usually below −10° C., for example, at −20° to −30° C. The temperature of the material is controlled by the temperature of the medium circulated through the spaces in the jacket and shelf of the vacuum chamber, in the event that apparatus of that type is used, or by thermostatic or other control of electrical heaters, etc. The material, during the drying operation, may and usually will puff in the trays or pans or other containers in which it is confined, with the result that the area available for evaporation becomes greater than is the case with materials maintained so cold that puffing does not take place, and the rate of drying may thus be substantially promoted. The heat input must be regulated to avoid melting, i. e., or liquefaction, of the material, which would result in uncontrollable foaming, so pronounced as to cause the material to spill out of the trays or other containers, or to block off the spaces within the vacuum chamber relied upon for the flow of the generated water vapor, and greatly impede the desiccation operation. The incorporation of the fresh juice in the concentrate aids in the control of the puffing or the foaming sometimes encountered in the freeze-drying or preconcentrated juice unless the temperature is kept at a level below those desirably used from the standpoint of production capacity of apparatus, e. g., as low as —25 to —30° C.

Toward the end of the drying operation, when most of the water has been removed, the temperature of the material is increased so that the material eventually reaches a temperature substantially in excess of normal room temperature, for example, as high as 60–65° C., to insure the reduction of the moisture content of the product to the lowest practicable level, advantageously about 0.2% or less. The material is then transferred to cans or the like in which it is sealed for storage and distribution. This transfer is advantageously carried out while the material is still at a temperature in excess of normal room temperature, to avoid or minimize absorption of water from the atmosphere during the transferring operation, as described in said Patent 2,396,561.

The invention will be further described in connection with the appended drawing which illustrates one form of apparatus which may be used with advantage in practicing the invention.

Figure 2:
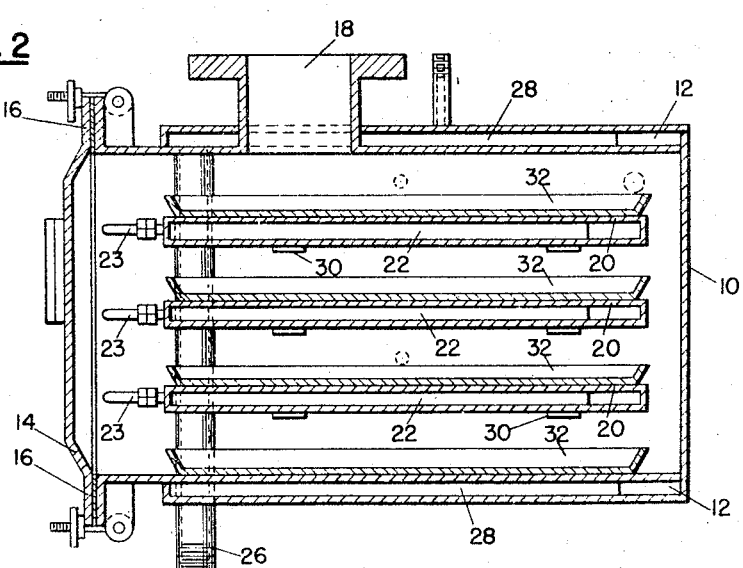

In the drawing, Fig. 1 is a sectional plan view of a suitable drying chamber and Fig. 2 is a sectional view of the side elevation thereof.

The apparatus illustrated consists of a chamber 10 jacketed at the top and bottom as illustrated at 12 and with a door 14 at the front provided with a suitable gasket 16 adapted to be closed to form a vacuum-tight seal. At the top is provided a flanged outlet 18 for connection to the means for producing a vacuum within the chamber and for the flow of generated water vapor from the chamber. In the chamber illustrated there are provided three hollow shelves 20 with interior spaces 22, the spaces 22 and 12 being connected by line 23 with the supply line 24 and by lines 25 to the drainage line 26, baffle 28 being provided within each of these spaces so that whatever medium is circulated therethrough will be evenly distributed and supply heat to or withdraw heat from metal surfaces reasonably uniformly. The shelves are supported on the brackets 30. In the apparatus illustrated, which is intended for the desiccation of materials in bulk, trays 32 are provided which rest upon the bottom of the chamber and upon each of the shelves. Instead of using separate trays as shown, the shelves themselves and the bottom of the chamber may be in the form of trays, being provided with suitable flanges. Because of the improved heat transfer to the material, it is frequently advantageous to use this form of construction instead of providing the separate trays as illustrated.

The sides of the trays advantageously slope at an angle of about 45–60° to assist in confining the product within the trays during the operation.

In carrying out the procedure in apparatus of the type illustrated to produce a desiccated orange juice, the preconcentrated product, having a volume of from about one-seventh to one-half its initial volume is admixed with a quantity of fresh orange juice equivalent to 25% of the volume of fresh orange juice represented by the preconcentrated product and the mixture is placed in the trays 32 and frozen.

The freezing can be accomplished by circulating a cold medium through the spaces provided in the shelves and the jacket of the chamber, or by placing the trays in a suitable refrigerating zone and introducing them into the chamber after the product is frozen, or by self-freezing by producing a relatively low vacuum, say a vacuum of 2–4½ mm., within the chamber and permitting evaporation to take place with concomitant cooling of the material and freezing of it either with or without circulating a cold medium through shelves and jacket. The amount of material placed in each tray should be such that each tray is but about one-quarter to one-third full, so that it may puff up to a substantial extent during the desiccation operation without spilling. Layers of material 1 to 2 inches thick process very well. When the material is frozen, a high vacuum is applied to the chamber in accordance with the usual procedure. Ordinarily a vacuum of about 500 microns is used at the start, and the desiccation proceeds. A heating medium, for example, warm or hot water at temperatures of 70–150° F., or even at a higher temperature, is circulated through the spaces within the shelves and the jackets of the chamber to supply the heat necessary for the sublimation to proceed. The temperature of the heating medium is controlled so that the concentrated, frozen product softens and puffs up somewhat, for example, to a volume of three or four times its initial volume or even somewhat more but not to an extent sufficient to spill over the sides of the trays or rise to the point where it comes into such close contact with the surface of the shelf above that, the escape of the generated water vapor is blanked and the drying operation retarded. In some cases where the product puffs up unduly, a mechanical contrivance may be used to break up the mass, permitting the escape of the vapor which causes the puffing or frothing, and reducing the volume of the mass. It should be understood that while the material is softened and is not brittle, it is not in any sense liquid, but on the contrary, can well be described as a plastic material.

By providing the trays 32 with sloping sides as illustrated, control of the puffing is facilitated. This follows from the fact that the product directly on the bottom of the tray is somewhat warmer than that which is resting on the sloping side walls, there being a temperature gradient from the bottom of the tray up the side walls. This difference is sufficient to keep the material adjacent the walls harder than the material resting on the bottom of the tray so that there is less frothing or puffing at the upper and outer edges, which assists in confining the product within the trays and preventing it from frothing over the sides.

Because of variations in the properties of preconcentrated juices, for example, orange juices, it is impossible to specify exact temperatures of the material during the processing operation, and the heat supply must be adjusted during the operation to permit the desired degree of puffing or frothing, that is, to permit the product to expand to a volume several times its initial volume without flowing out of the trays or sealing the spaces through which the vapors must pass. Thus juices from Florida oranges as a general rule requires lower temperatures than the juice from California oranges. The juice from Florida Valencia oranges in general requires lower temperatures than the juice from seedlings and juice from late season oranges in general lower temperatures than the juice from early season oranges. I know of no explanation for these observed differences in behavior except sugar content.

As a typical illustration, however, of an operation carried out in apparatus such as that illustrated an orange juice concentrate produced by vacuum concentration at 10° C. of a fresh Florida orange juice to a concentration of about 3.5:1 was admixed with 25% by volume, based on the juice from which the concentrate was made, of fresh orange juice and the mixture was placed in trays as illustrated to a depth of about one inch. It was then frozen by circulating a cold refrigerant through the jacket and spaces of the shelves of the apparatus, the temperature of the material being reduced in this way to about —30° C. A high vacuum was then applied to a chamber and a heating medium circulated through the jacket and the spaces in the shelves. The inlet temperature of the heating medium was about 120° F. The pressure within the apparatus was maintained at 150μ for about four hours and then gradually reduced to about 10μ over a period of about eight hours and maintained at that level for a further eight hours. The temperature of the material being dried stayed below about —10° C. for about three hours and then gradually rose to plus 40° C. At the start of the high vacuum operation the frozen material puffed somewhat and its volume substantially increased, but not to an extent such as to interfere with the free flow of vapors or to overflow from the trays. At the end of the operation the dried orange juice was removed from the chamber and packed in dried cans.

Instead of using the particular freeze drying process described above, which involves a batch operation, with the material frozen in trays within a vacuum chamber and heated by a medium circulated through the jacket and the spaces in the shelves, the operation may be carried out in a continuous manner and heating may be accomplished in other ways as by radiant heat e. g., with lamps or resistance heaters or other types of radiant heaters in the vacuum chamber. The admixture of preconcentrated and fresh juice may be introduced through a suitable vacuum lock or by spraying onto a heated moving conveyor in the vacuum chamber, advantageously with a second heated belt above the moving layer of frozen material or with the use of radiant heaters above the moving layer, the heat input being appropriately controlled to provide puffing of the product without melting or liquefaction. With such continuous apparatus the material may be sprayed onto the conveyor, freezing being accomplished by the cooling incident to evaporation in the vacuum chamber or the material may be prefrozen and introduced in the form of granules or chips, or the material may even be flowed onto the conveyor belt and frozen thereon by vacuum evaporation. With such procedure, the dried material leaving the end of the conveyor may be removed by a suitable mechanical scraper and removed from the vacuum apparatus by a suitable lock of the usual type.

I claim:

The process of desiccating orange juice which comprises concentrating a proportion of the juice in the liquid state, admixing the resulting concentrated product with a proportion of fresh, unconcentrated juice equal in volume to from about 10% to about 50% of the original volume of the concentrated juice, freezing the resulting admixture and removing water from the frozen product by the use of a high vacuum.

EARL W. FLOSDORF.

REFERENCES CITED

The following references are of record in the file of this patent:

UNITED STATES PATENTS

| Number | Name | Date |
| --- | --- | --- |
| 1,189,127 | Kellogg | June 27, 1916 |
| 1,379,470 | Monti | May 24, 1921 |
| 2,071,011 | Wendt | Feb. 16, 1937 |
| 2,087,077 | Wadsworth et al. | July 13, 1937 |
| 2,248,634 | Krause | July 8, 1941 |
| 2,388,917 | Hormel | Nov. 13, 1945 |

OTHER REFERENCES

Progress in Drugs, Fine Chemicals and Biological Products During 1945, by G. C. Green, The Chemical Age, Feb. 9, 1946, pg. 161 relied on.